United States Patent
Hackius et al.

(10) Patent No.: US 8,413,878 B2
(45) Date of Patent: Apr. 9, 2013

(54) SYSTEM AND METHOD FOR MANUFACTURING WELDED STRUCTURES, AND A WELDING ADDITIVE MATERIAL FOR THIS PURPOSE

(75) Inventors: Jens Hackius, Bremen (DE); Rainer Kocik, Bremen (DE)

(73) Assignee: Airbus Deutschland GmbH, Hamburg (DE)

( * ) Notice: Subject to any disclaimer, the term of this patent is extended or adjusted under 35 U.S.C. 154(b) by 229 days.

(21) Appl. No.: 12/503,809

(22) Filed: Jul. 15, 2009

(65) Prior Publication Data

US 2009/0277888 A1    Nov. 12, 2009

Related U.S. Application Data

(62) Division of application No. 11/234,618, filed on Sep. 22, 2005, now abandoned.

(60) Provisional application No. 60/618,128, filed on Oct. 13, 2004.

(30) Foreign Application Priority Data

Sep. 22, 2004   (DE) .......................... 10 2004 045 961

(51) Int. Cl.
   *B23K 35/12*    (2006.01)
(52) U.S. Cl.
   USPC ...... 228/249; 228/245; 228/56.3; 219/121.64
(58) Field of Classification Search .................. 228/56.3, 228/245, 249; 219/121.64
   See application file for complete search history.

(56) References Cited

U.S. PATENT DOCUMENTS

| 4,134,607 | A  | 1/1979  | Koski        |
|-----------|----|---------|--------------|
| 5,841,098 | A  | 11/1998 | Gedrat et al.|
| 6,364,250 | B1 | 4/2002  | Brinck et al.|
| 2005/0029327 | A1 | 2/2005 | Becherer   |

FOREIGN PATENT DOCUMENTS

| DE | 610819     |    | 3/1935  |
|----|------------|----|---------|
| DE | 2153263    |    | 10/1971 |
| DE | 3809488    | A1 | 10/1988 |
| DE | 19623103   | A1 | 12/1997 |
| DE | 19639667   | C1 | 3/1998  |
| DE | 19844035   | C1 | 11/1999 |
| DE | 10336693   | A1 | 3/2005  |
| EP | 0204145    | A1 | 12/1986 |
| EP | 0525469    |    | 2/1993  |
| FR | 2704469    | A1 | 11/1994 |
| JP | 06285623   | A  | * 10/1994 |

OTHER PUBLICATIONS

Canadian Office Action for Application No. 2,520,678 issued by the Canadian Intellectual Property Office on Jan. 30, 2012, 3 pages.

* cited by examiner

*Primary Examiner* — Nicholas P D'Aniello
(74) *Attorney, Agent, or Firm* — Paradies Law PA; Christopher Paradies

(57) ABSTRACT

A system and method for manufacturing welded structures comprises components to be welded, a welding additive material which, before the welding, has a shaped profile and the shaped profile is disposed between components to be welded and conforms with at least one of the components to be welded. At least one heat source is used in the method to weld the components, producing a weld seam on at least one side of one of the components.

10 Claims, 4 Drawing Sheets

SYSTEM AND METHOD FOR MANUFACTURING WELDED STRUCTURES, AND A WELDING ADDITIVE MATERIAL FOR THIS PURPOSE

RELATED APPLICATIONS

This application is a divisional of U.S. patent application Ser. No. 11/234,618, filed Sep. 22, 2005 (now pending), which claims the benefit of the filing date of U.S. Provisional Patent Application No. 60/618,128, filed Oct. 13, 2004, the disclosure of which is incorporated herein by reference. This application further claims the benefit of the filing date of German Patent Application No. 10 2004 045 961.4, filed Sep. 22, 2004.

FIELD OF THE INVENTION

The field relates to a system and to a method for manufacturing welded structures, as well as to a welding additive material for this purpose, particularly for the field of transportation engineering, such as aviation.

BACKGROUND

In aircraft, aviation structures loaded with internal pressure over a large area, particularly fuselage shell structures, are joined using riveting, welding, or gluing methods. In this case, complex fuselage shell structures, such as clip-skin bonds, are primarily joined by rivets.

However, the riveting technology cited has the disadvantage that the weight of complex fuselage shell structures increases because of sheet metal overlaps between clip and skin and through sealing compound introduced into the joint zone.

Laser beam welding using additive material in the form of wires suggests itself as an alternative. However, the very low accessibility of the welding head because of the welding wire delivery device is a disadvantage of this method.

Furthermore, it has been shown that with this solution, the strength properties of the weld seam are reduced in comparison to those of the base material, because of loss of material cohesion as a result of inhomogeneous weld metal mixing with additive material in the form of wires. The mechanical-technological properties are reduced by cracks, notches, and craters if additive material in the form of wires is used in the starting region and end region of a clip in particular.

SUMMARY OF THE INVENTION

A system for manufacturing welded structures comprises positioning of a welding additive material in a location at which the components are to be welded to one another prior to welding. According to one embodiment of the present invention, the welding additive material is adapted to the shape of at least one of the components. The material of the components and the welding additive material are melted by using a heat source, such as a laser beam, an electron beam, or other heat source, in order to produce a bond between or among the components that are welded to one another.

According to one embodiment of the present invention, two heat sources are used, and the welding additive material is formed in a U-shaped profile disposed between or among components to be welded. A weld seam may be formed by the U-shaped profile on each side of one of the components that is fitted into the U-shaped profile.

In an alternative embodiment, only one heat source is used, and the welding additive material has, for example, an L-shaped profile. Disposing the L-shaped welding additive material between or among components to be welded, results in a weld seam being formed on one side of the component fitted into the L-shaped profile that is wider on one side of the fitted component than on the other side of the same component.

A method for bonding components uses shaped welding additive materials. The welding additive material is first disposed between or among components to be welded prior to welding. The shape and location of the welding additive material is disposed at a location at which the components are to be bonded to one another. The external shape of the welding additive material may be selected to produce a high quality weldment using one or multiple heat sources. A heat source, such as a laser beam, electron beam or other heat source, may be directed in such a way that the welding additive material melts with or without substantial melting of the surfaces of the components to be joined. A low temperature welding additive material may be used for brazing, which does not melt the components to be joined, merely adhering the components together. A material with a higher melting temperature may be used for producing a weldment between or among components, which causes a portion of the components to at least partially melt during heating, producing a resolidified weldment at the joint between or among the components. It should be understood that the method may be used for welding and brazing of components by merely selecting an appropriate additive material.

According to one embodiment of the present invention, a system and a method are provided for manufacturing welded structures, wherein a weld seam may have improved mechanical properties, and an additive material may be provided which may be used in the system and method.

According to one embodiment of the present invention, the welding additive material is characterized in that it has a construction (profile), which is tailored to the construction of a corresponding component which is to be welded. For example, the welding additive material has a U-profile or an L-profile.

Manufacturing advantages may be achieved in relation to welding additive materials in the form of wire through a simplified manufacturing concept for a cost-effective welding method within complex structures. The wire delivery device for conventional welding process may be dispensed with. Thus, the welding head may have greater accessibility to the joints to be welded.

In addition, manufacturing advantages may result in that a lower effort is required for quality assurance, because of simplified process control in regard to the presence of additive material in the additive material, since the pre-positioning of the additive by disposing one component within the additive material disposed at the joint prior to welding does not require any online control of positioning of the welding material during the welding process, itself.

In addition, mechanical-technological property improvements of the weld seam result in a lower notch effect and defects, reducing stress concentrators, due to seam geometry design. This may be tailored to the design of the components being produced using welding. Using the additive material according to one embodiment of the present invention, cracks, notches, and craters as a result of inhomogeneous weld material mixing may be prevented. The improved mechanical-technological property of the weld seam may also result through lower loss of material cohesion because of lower energy input per unit length.

In addition, process technology advantages may also be achieved by exemplary embodiments of the present invention, since the laser welding process is stabilized by uniform distribution of the additive material over the entire seam cross-section, which may result in lower process porosity in the weld seam. The increased process reliability may be achieved by cross-sectional dimensions of the additive material which may be tailored nearly arbitrarily.

BRIEF DESCRIPTION OF THE DRAWING

Examples of the invention are described with reference to the drawings, similar components are provided with the same reference numbers in the drawings to make comparison among the drawings easier.

DETAILED DESCRIPTION OF PREFERRED EMBODIMENTS

Figure 1:
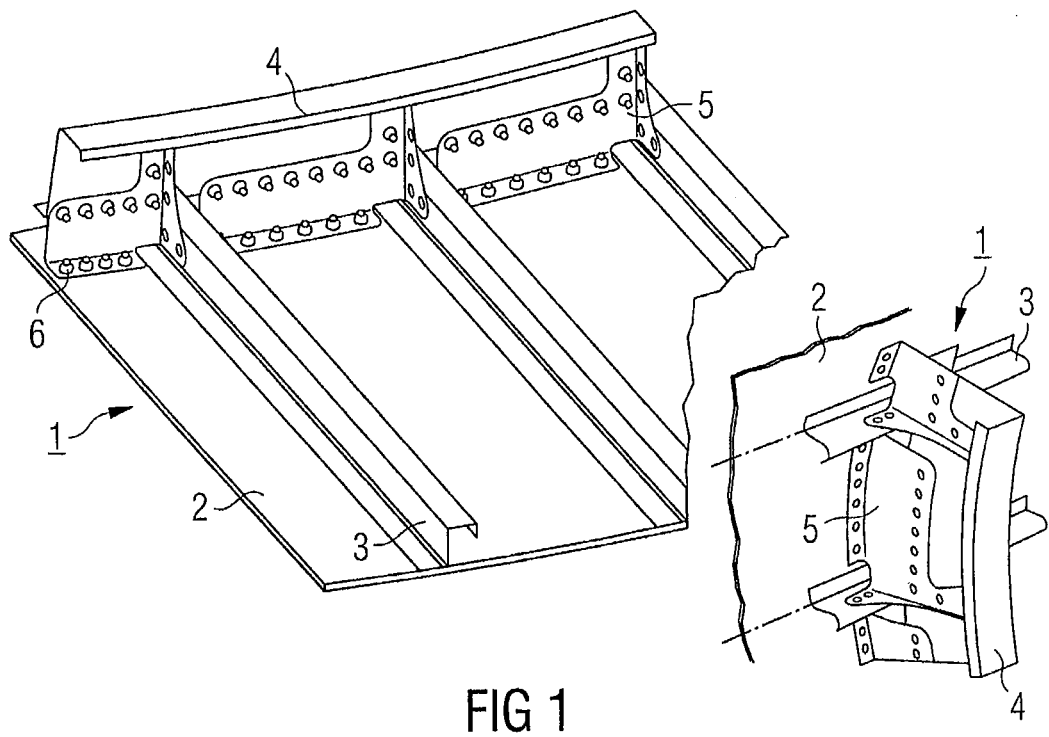
FIG. 1 shows a perspective partial view of an aircraft fuselage to illustrate a riveted clip-skin bond.

FIG. 1 shows a perspective partial view of an aircraft fuselage 1 to illustrate a riveted clip-skin bond. An external skin 2 of the aircraft fuselage 1 is shown, on which a plurality of stringers 3 are positioned. A mounted frame (or former) profile 4 is shown transversely to the longitudinal direction of the stringers 3. The frame profile 4 typically extends over multiple stringers 3 in a direction which runs essentially perpendicularly to the longitudinal direction of a stringer 3. The frame profile 4 is attached using a clip-skin bond to the external skin 2 of the aircraft fuselage 1 by a plurality of rivets 6. There is sheet metal overlap between the clip 5 and the external skin 2 of the aircraft fuselage 1, which results in an increase of the weight of the aircraft structure. In addition, a sealing compound must be introduced into the joint zone in a clip-skin bond of this type, which results in further weight disadvantages.

Figure 2:
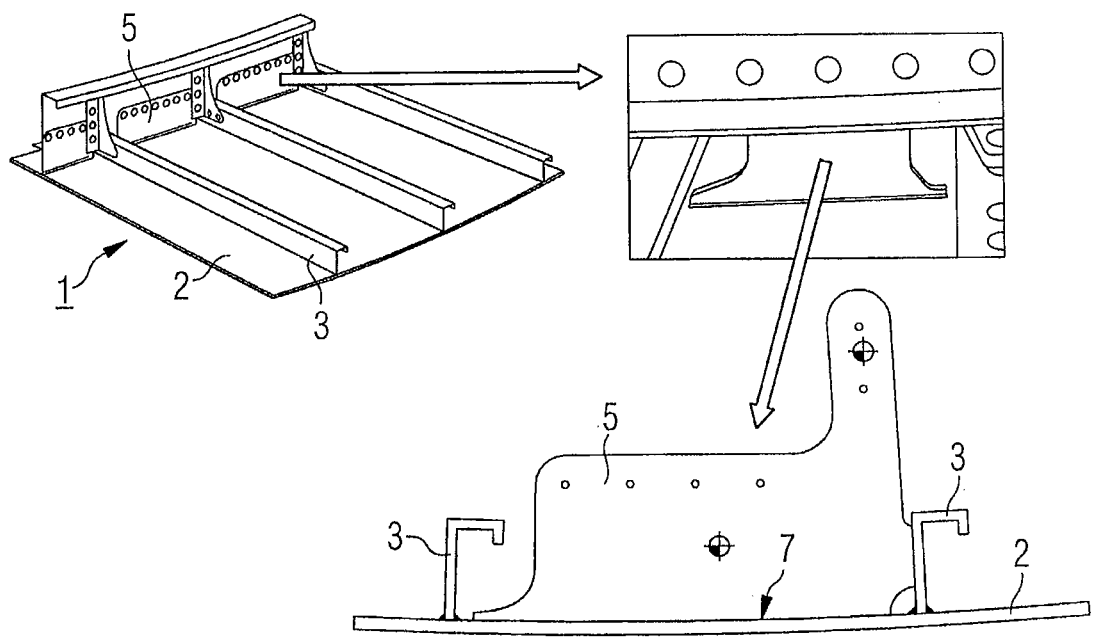
FIG. 2 shows a perspective partial view and side view of a welded clip-skin bond.
Figure 3:
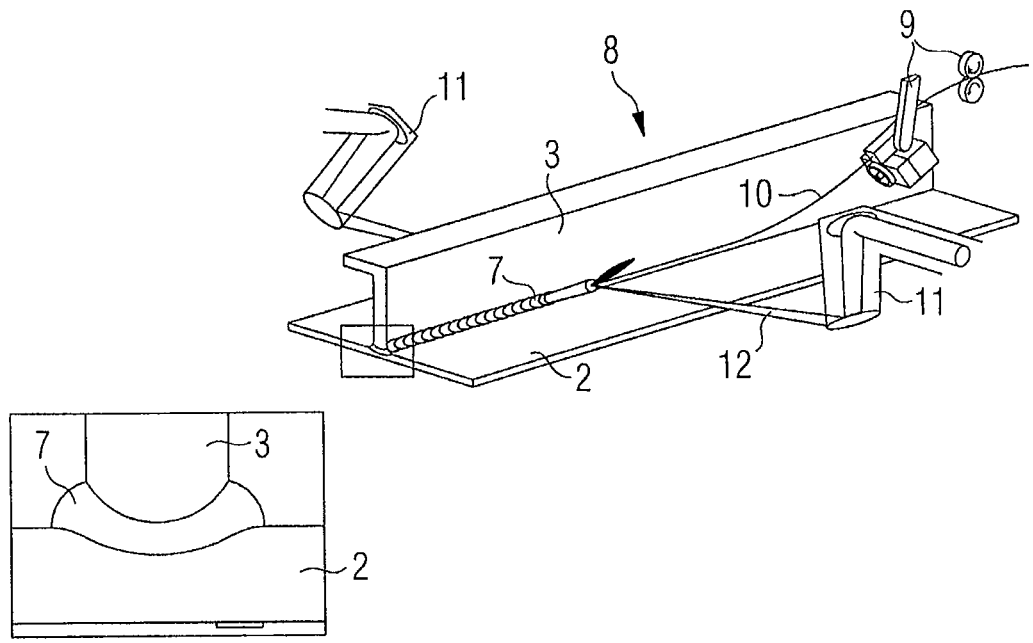
FIG. 3 shows a perspective view of a system for manufacturing a welded structure, and a cross-sectional view of the weld seam.

FIG. 2 shows a perspective partial and side view of a welded clip-skin bond. FIG. 2 differs from FIG. 1 solely in that instead of the rivet 6 between the external skin 2 and the clip 5, a weld seam 7 is provided. Weld seam 7 preferably extends over the entire contact surface between the clip 5 and the external skin 2 of the aircraft fuselage 1. FIG. 3 shows a perspective view of a system 8 for manufacturing the welded structure shown in FIG. 2, and a cross-sectional view of a weld seam which is produced. This shows an example of how a stringer 3 is welded to the external skin 2 of an aircraft fuselage. In the same way, it is also possible to weld the clip 5 directly to the external skin 2 of the aircraft fuselage. A welding additive material wire 10 is continuously supplied during the welding procedure using a wire delivery device 9. A heat source 11 sends a laser beam 12, for example, to a location at which the stringer 3 is to be welded to the external skin 2. In the system shown in FIG. 3, the heat source 11 and/or the laser beam 12 preferably moves along predefined locations at which a weld seam is to be produced.

FIG. 3 also shows a second heat source 11, which also produces a welded bond (weld seam) between the stringer 3 and the external skin 2 on the diametrically opposite side of the stringer 3. Although it is not shown, a wire delivery device may also be positioned on the other side to produce a desired weld seam profile.

Figure 4A:
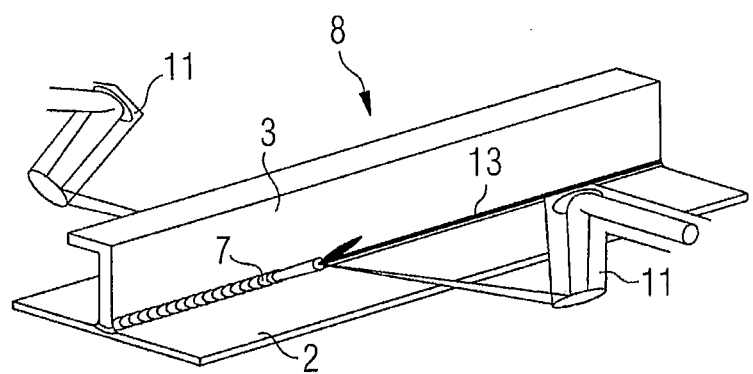
FIG. 4A shows a perspective view of a system for manufacturing a welded structure.
Figure 4C:
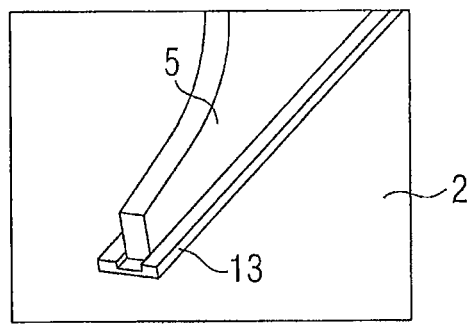
FIG. 4C illustrates an example of a U-shaped profile of the additive material prior to welding.

FIG. 4A shows a perspective view of an example of a system 8 for manufacturing a welded structure, according to the present invention. The system 8 differs from the system shown in FIG. 3 in that no wire delivery device is used. Instead, a welding additive material 13, having geometry tailored to the construction of the components, is pre-positioned between a stringer 3 and an external skin 2. Subsequently, a weld seam 7 is formed by the heating of the joint by a laser beam 12. The shape of the welding additive material 13 is selected according to the design of the component to be produced by welding individual components together. The system 8, as shown in FIG. 4A, comprises two heat sources 11, which each emit a laser beam 12 focused on the joint between the stringer 3 and the skin 2. For example, a U-shaped profile, as shown in FIG. 4C may be used in order to connect the stringer 3 and the external skin 2 using two weld seams 7 (only one is shown in the figure), according to the system 8 shown in FIG. 4A.

Figure 4B:
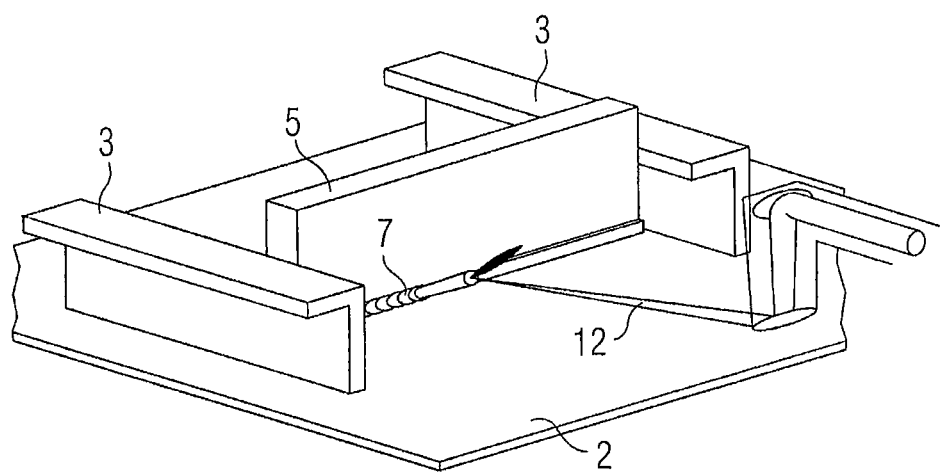
FIG. 4B shows a perspective view of another system for manufacturing a welded structure.
Figure 5:
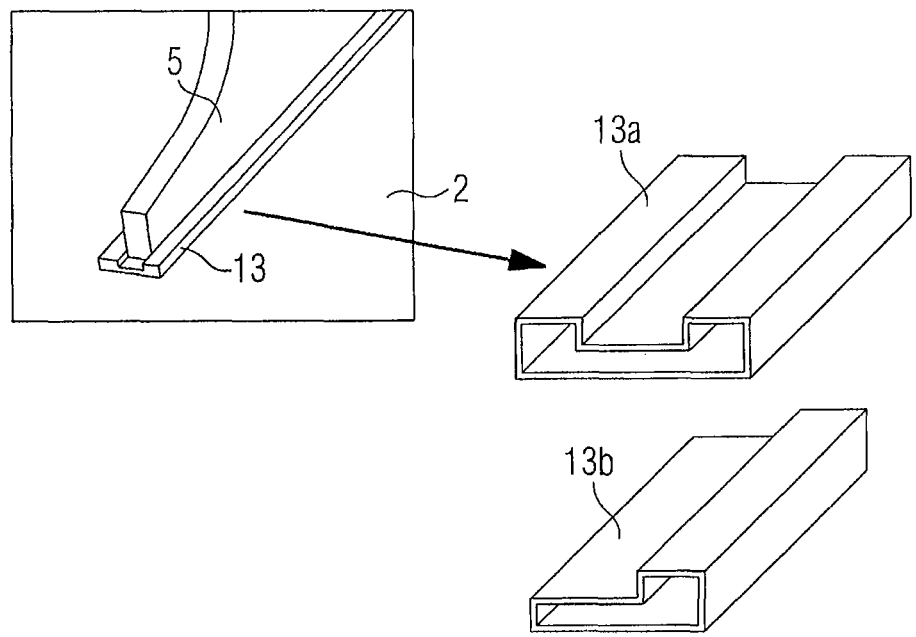
FIG. 5 shows perspective views of alternative profile shapes of a welding additive material.

It is clear that, depending on the load requirement, only one weld seam 7 may also be produced, such as by the system shown in FIG. 4B, for example. FIG. 4B shows a clip 5 being welded to an external skin 2, according to another embodiment. The welding additive material 13 has a shape selected to produce a desired weld seam profile. For example, the stringers 3 shown in FIG. 4B may be welded to the external skin 2 according to the system shown in FIG. 4A or may be joined to the external skin 2 in any other way, such as by rivets (not shown in the figure). FIG. 5 illustrates alternative examples of profile shapes of the welding additive material. For example, a U-shaped profile 13a may be used in order to form symmetric weld seams on each side of a component, such as a stringer 3 or clip 5, disposed in the pocket of the U-shaped profile 13a. Two laser beams may be used to simultaneously heat both sides of the joint, resulting in a high quality weldment. The U-shaped profile is selected to conform with the shape of the components and the weldment to be produced. Welding, such as laser welding, is used to melt the materials at the joint such that the components 3,5 are fixedly bonded to the skin 2 by a high quality weldment.

According to an alternative exemplary embodiment, the welding additive material has an L-shaped profile 13b. According to this embodiment, one-sided welding using a single laser beam is capable of forming a weld seam 7 on one side of the component.

Figure 6:
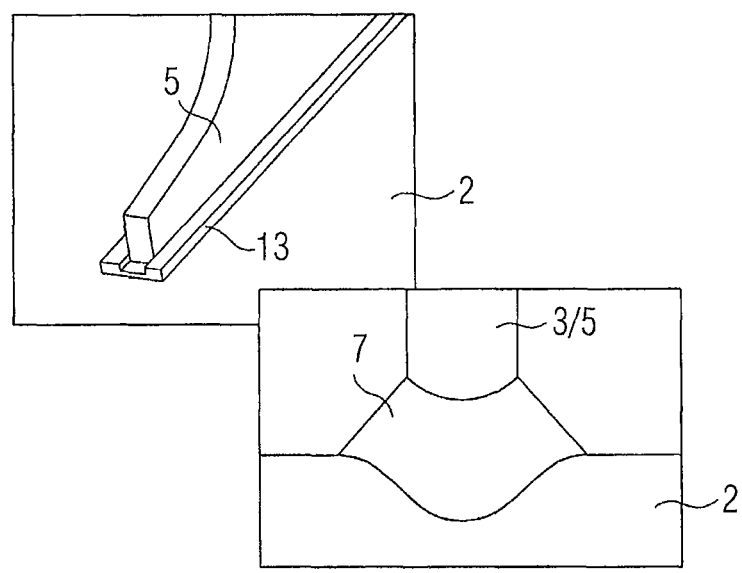
FIG. 6 shows a cross-sectional view of a weld seam after welding using a method according to the present invention.

FIG. 6 shows a cross-sectional view of a weld seam 7 having good mechanical properties, without cracks, notches, and craters that is produced using the additive material 13. Homogeneous weld material mixing occurs when the welding additive material 13, which is tailored to the construction of the component, is melted by the laser beam and forms a bond with the melted material of the component 3,5 and the melted material of the external skin 2, producing at least one weld seam 7.

Although embodiments of the present invention were described above with reference to a field of application relating to traffic engineering, particularly aviation, the invention is applicable for any field of application in which components have to be welded to one another. The profile shapes cited in the exemplary embodiments are merely exemplary and are a function of the designs of the components to be welded. Particularly, there is essentially a tailoring to the surface of the areas of the components which are welded to one another.

It should be noted that the term "comprising" does not exclude other elements or steps and the "a" or "an" does not exclude a plurality. Also elements described in association with different embodiments may be combined.

It should also be noted that reference signs in the claims shall not be construed as limiting the scope of the claims.

LIST OF REFERENCE NUMERALS 1 aircraft fuselage
2 external skin
3 stringer
4 frame profile
5 clip
6 rivets
7 weld seam
8 system
9 wire delivery device
10 welding additive material wire
11 heat source
12 laser beam
13 welding additive material
13a U-profile
13b L-profile

The invention claimed is:

1. A method of welding for joining an external skin of an aircraft fuselage and a clip together, the method comprising:
   prepositioning a welding additive material as an element at a location of the external skin at which the external skin and the clip are to be joined,
   the welding additive material consisting of a single U-shaped profile forming a pocket, the welding additive material being provided separately from the clip, such that a surface of the pocket of the welding additive material conforms around a portion of a surface of the clip when the clip is disposed into the pocket of the welding additive material as a component separate from the welding additive material;
   disposing the clip between two stringers and in the pocket of the single U-shaped profile;
   melting the welding additive and at least a portion of the external skin and the clip such that the clip is fused to the external skin; and
   attaching a frame to the clip.

2. The method of claim 1, wherein a weld seam formed during the step of melting homogeneously mixes the welding additive material in the weld seam forming a bond with the melted material of the clip and the melted material of the external skin of the aircraft fuselage.

3. The method of claim 1, wherein the step of prepositioning prepares the welding additive material having a U-shaped profile.

4. The method of claim 1, wherein the U-shaped profile is defined by a first end of the U-shaped profile, an intermediate portion of the U-shaped profile, and a second end of the U-shaped profile, connected to the first end by the intermediate portion and opposite the first end, and the step of disposing disposes an edge of the clip within the U-shaped profile such that the first end, the intermediate portion and the second end are put into intimate contact with an edge of the clip prior to the step of melting, such that after the step of prepositioning and disposing, during the step of melting, no control of positioning of the welding material is required and the welding head has accessibility to the first end and the second end of the U-shaped profile.

5. The method of claim 4, wherein the step of melting includes a first laser beam being directed onto a portion of the first end of the U-shaped profile and a second laser beam being disposed on an opposite side of the clip from the first laser beam and being directed onto a portion of the second end of the U-shaped profile, such that a symmetric weld seam is formed by the heat generated by the simultaneous propagation of the first laser beam and the second laser beam during the step of melting.

6. The method of claim 1, wherein the welding additive material conforms to an edge of the clip to be welded to the external skin.

7. A method of welding an external skin of a fuselage and a clip, and of attaching a frame to the clip, the method comprising:
   using an element consisting of a welding additive material, the element consisting of a single U-shaped profile provided separately from the clip;
   disposing the element, prior to welding, between the external skin and the clip such that the U-shaped profile conforms to a shape of the clip and the element and the clip are disposed between two stringers;
   melting the welding additive material and at least a portion of the external skin and a portion of the clip in contact with the welding additive material such that a weld seam is formed, the weld seam including a mixture of the welding additive material and the at least a portion of the external skin and a portion of the clip in contact with the welding additive material, such that the clip is fused to the external skin; and
   attaching a frame to the clip.

8. The method of claim 7, wherein the step of melting forms a weld seam extending over an entire contact surface between the clip and the external skin.

9. The method of claim 8, wherein the step of melting applies a first laser beam to form the weld seam.

10. The method of claim 9, wherein the step of melting applies a second laser beam, opposite from the first laser beam, and controls, simultaneously, the first laser beam and the second laser beam such that a symmetric weld seam is formed during the step of melting.

* * * * *